United States Patent
Kim et al.

(10) Patent No.: US 9,397,811 B2
(45) Date of Patent: Jul. 19, 2016

(54) METHOD AND APPARATUS FOR TRANSMITTING AND RECEIVING DATA IN WIRELESS COMMUNICATION SYSTEM

(71) Applicant: Samsung Electronics Co., Ltd., Suwon-si, Gyeonngi-do (KR)

(72) Inventors: Tae-Yoon Kim, Seongnam-si (KR); Heun-Chul Lee, Pocheon-si (KR); Jong-Han Lim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 55 days.

(21) Appl. No.: 14/152,291

(22) Filed: Jan. 10, 2014

(65) Prior Publication Data

US 2014/0341122 A1 Nov. 20, 2014

(30) Foreign Application Priority Data

May 16, 2013 (KR) .................. 10-2013-0055950

(51) Int. Cl.
*H04L 5/00* (2006.01)
(52) U.S. Cl.
CPC .............. *H04L 5/0051* (2013.01); *H04L 5/005* (2013.01); *H04L 5/0073* (2013.01)
(58) Field of Classification Search
CPC .............................. H04W 72/04; H04W 24/10
See application file for complete search history.

(56) References Cited

U.S. PATENT DOCUMENTS

| | | | |
|---|---|---|---|
| 2011/0044250 A1 | 2/2011 | Han et al. | |
| 2011/0243009 A1* | 10/2011 | Chandrasekhar et al. | .... 370/252 |
| 2011/0274031 A1 | 11/2011 | Gaal et al. | |
| 2012/0114021 A1 | 5/2012 | Chung et al. | |
| 2013/0034358 A1 | 2/2013 | Sung et al. | |
| 2013/0208669 A1 | 8/2013 | Pan et al. | |
| 2014/0133333 A1* | 5/2014 | Liu et al. | ......................... 370/252 |
| 2015/0131604 A1* | 5/2015 | Hammarwall | ................ 370/252 |

FOREIGN PATENT DOCUMENTS

| | | |
|---|---|---|
| KR | 10-2012-0127650 A | 11/2012 |
| KR | 10-2013-0015065 A | 2/2013 |

OTHER PUBLICATIONS

LG Electronics, Resource Allocation and Downlink Control Channel Structure for Relay Backhaul Link, 3GPP TSG RAN WG1 Meeting #57, R1-092115, May 4, 2009, San Francisco, USA.

* cited by examiner

*Primary Examiner* — Albert T Chou
(74) *Attorney, Agent, or Firm* — Jefferson IP Law, LLP

(57) ABSTRACT

A method of transmitting data in a wireless communication, by a first Base Station (BS) is provided. The method includes receiving control information including information related to transmission of a Reference Signal (RS) of at least one second BS from the at least one second BS adjacent to the first BS and transmitting data by using a preset method based on the control information when an RS transmission mode of the at least one second BS is different from an RS transmission mode of the first BS.

18 Claims, 10 Drawing Sheets

METHOD AND APPARATUS FOR TRANSMITTING AND RECEIVING DATA IN WIRELESS COMMUNICATION SYSTEM

CROSS-REFERENCE TO RELATED APPLICATION(S)

This application claims the benefit under 35 U.S.C. §119 (a) of a Korean patent application filed on May 16, 2013 in the Korean Intellectual Property Office and assigned Serial No. 10-2013-0055950, the entire disclosure of which is hereby incorporated by reference.

TECHNICAL FIELD

The present disclosure relates to a method and apparatus for transmitting/receiving data in a wireless communication system.

BACKGROUND

In a next generation wireless communication system, a cell radius becomes very small in comparison with a cellular environment according to the related art and cells have non-uniform distribution due to operations of various cells such as a femto cell and the like. In such an environment, inter-cell interference is the largest factor associated with deterioration of the capability of a User Equipment (UE) according to a packet error.

In order to solve an interference problem in the wireless communication system, accurately estimating an interference signal and channel information on the interference signal is required. In order to accurately estimate an interference signal and channel information on the interference signal, a Reference Signal (RS) may be transmitted on an Orthogonal Frequency Division Multiplex (OFDM) domain in the wireless communication system (e.g., Long Term Evolution (LTE)).

As an example, the RS may include a UE-specific Reference Signal (URS). The URS refers to an RS used in a transmission mode using beamforming. In general, the URS is transmitted to improve the capability of each UE and is transmitted using a Resource Block (RB) to which a data signal is allocated in a corresponding OFDM signal.

In a wireless communication system according to the related art, the URS of each cell may be transmitted using the same resource as that of the URS or data of an adjacent cell according to a transmission mode of the adjacent cell. In this case, because an inter-cell interference problem according to URS transmission is continuously generated in the wireless communication system, a channel estimation capability of the UE within each cell may deteriorate.

Accordingly, a method of solving the inter-cell interference problem in the URS transmission should be used in the wireless communication system. However, when such a method is used, complexity associated with signal transmission/reception increases. Therefore, a method of fundamentally solving the inter-cell interference problem is required.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and an apparatus for transmitting/receiving data in a wireless communication system.

Another aspect of the present disclosure is to provide a method and an apparatus for preventing received signal quality of the User Equipment-specific Reference Signal (URS) from deteriorating due to inter-cell interference in a wireless communication system.

Another aspect of the present disclosure is to provide a method and an apparatus for reducing complexity according to signal transmission/reception in a wireless communication system and improving a channel estimation capability of a User Equipment (UE).

In accordance with an aspect of the present disclosure, a method of transmitting data in a wireless communication, by a first Base Station (BS) is provided. The method includes receiving control information including information related to transmission of a Reference Signal (RS) of at least one second BS from the at least one second BS adjacent to the first BS, and transmitting data by using a preset method based on the control information when an RS transmission mode of the at least one second BS is different from an RS transmission mode of the first BS.

In accordance with another aspect of the present disclosure, a method of receiving data in a wireless communication system, by a UE is provided. The method includes: receiving, from a first BS, control information including information related to transmission of a RS of at least one second BS adjacent to the first BS and receiving data from the first BS by using a preset method based on the control information, wherein an RS transmission mode of the at least one second BS is different from an RS transmission mode of the first BS.

In accordance with another aspect of the present disclosure, a first BS in a wireless communication system is provided. The first BS includes a transmitter a receiver that is configured to receive control information including information related to transmission of a RS of at least one second BS adjacent to the first BS from the at least one BS, and a controller that is configured to control the transmitter to transmit data by using a preset method based on the control information when an RS transmission mode of the at least one second BS is different from an RS transmission mode of the first BS.

In accordance with another aspect of the present disclosure, a UE in a wireless communication system is provided. The UE includes: a receiver that is configured to receive control information including information related to transmission of a RS of at least one second BS adjacent to a first BS from the first BS and a controller that is configured to control the receiver to receive data from the first BS by using a preset method based on the control information, wherein an RS transmission mode of the at least one second BS is different from an RS transmission of the first BS.

Aspects of the present disclosure have an effect in which the UE can receive a URS without any interference as each cell does not transmit a signal in a position of a Resource Element (RE) at which a URS of an adjacent cell is transmitted.

Aspects of the present disclosure have an advantage of improving a channel estimation capability of the UE as data of a second cell corresponding to an adjacent cell of a first cell is not transmitted in a position of the RE at which a URS of the first cell among a plurality of cells is transmitted.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1A:
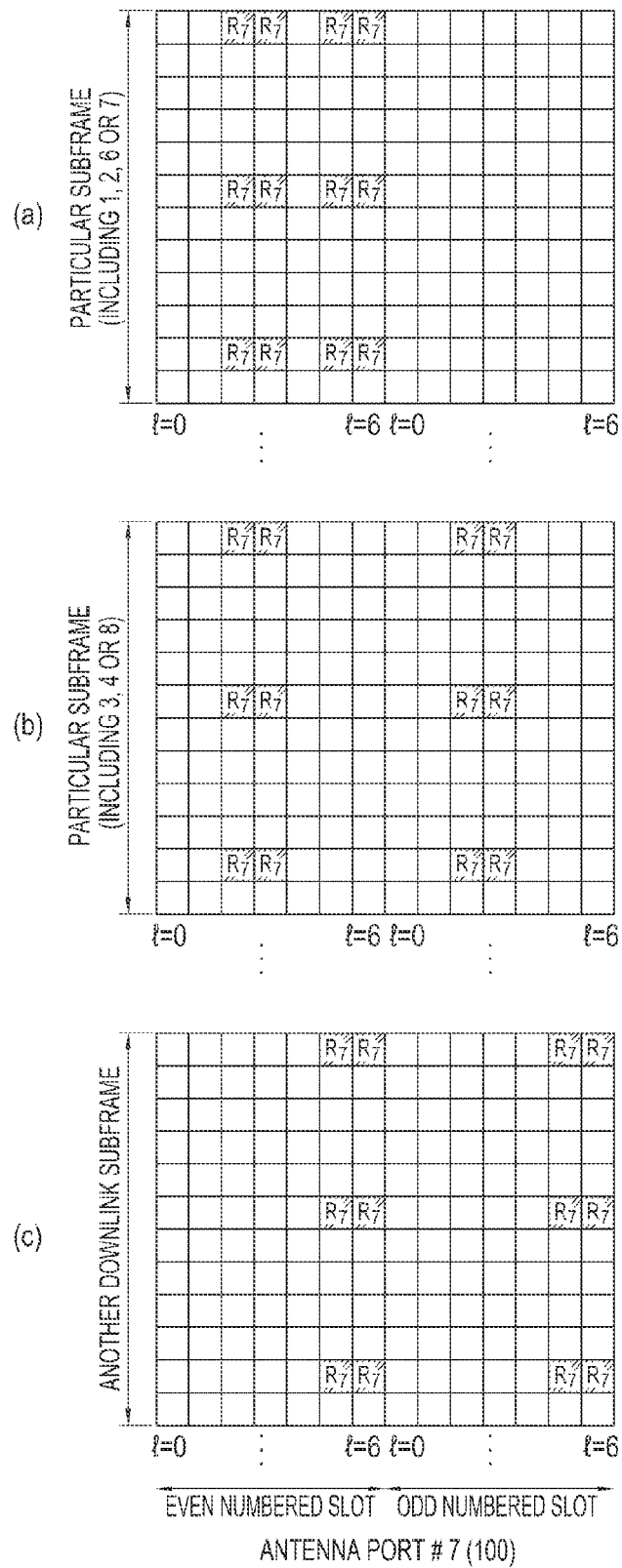
FIGS. 1A, 1B, 1C, and 1D are diagrams illustrating examples of mapping between a Resource Block (RB) and a UE-specific Reference Signal (URS) used in a wireless communication system according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

As a non-exhaustive illustration only, a User Equipment (UE) described herein may refer to mobile devices such as a cellular phone, a Personal Digital Assistant (PDA), a digital camera, a portable game console, an MP3 player, a Portable/Personal Multimedia Player (PMP), a handheld e-book, a tablet PC, a portable lap-top PC, a Global Positioning System (GPS) navigation, and the like capable of wireless communication or network communication consistent with that disclosed herein.

Various embodiments of the present disclosure provide a method and an apparatus for controlling an interference signal in a wireless communication system. Specifically, various embodiments of the present disclosure provide a method and an apparatus in which a first Base Station (BS) receives control information including Reference Signal (RS) transmission-related information of one or more second BSs from the one or more second BSs adjacent to the first BS and does not allocate data to a resource used for transmitting the RS by the one or more second BSs based on the control information when an RS transmission mode of the one or more second BSs is different from an RS transmission mode of the first BS.

The RS transmission mode may include a transmission mode based on a Cell-Specific Reference Signal (CRS) and a transmission mode based on a UE-Specific Reference Signal (URS). Hereinafter, it will be described as an example that the first BS uses the transmission mode based on the CRS and the one or more second BSs use the transmission mode based on the URS. Of course, the method and the apparatus, which are provided by the various embodiments of the present disclosure, described below may be applied to a case in which the first BS uses the transmission mode based on the URS and the one or more second BSs use the transmission mode based on the CRS.

According to various embodiments of the present disclosure, the wireless communication system may be a wireless communication system requiring an interference control, such as a Global System for Mobile communications (GSM), Wideband Code Division Multiple Access (WCDMA), a Universal Mobile Telecommunications System (UMTS), a Long Term Evolution (LTE) system, or the like. Hereinafter, a case in which the wireless communication system is an LTE communication system will be described as an example for convenience of the description.

Prior to a detailed description of various embodiments of the present disclosure, the URS will be briefly described. The URS is an RS transmitted to improve a capability of each UE in a transmission mode using beamforming, which may not be transmitted for each symbol but may be transmitted for each transmission antenna.

Hereinafter, the URS will be described with reference to FIGS. 1A to 1D.

FIGS. 1A, 1B, 1C, and 1D are diagrams illustrating examples of mapping between a Resource Block (RB) and a URS used in a wireless communication system according to an embodiment of the present disclosure.

Referring to FIGS. 1A, 1B, 1C, and 1D, examples in which the URS is mapped into the RB corresponding to each of antenna ports #7 100, #8 105, #9 104, and #10 106 are illustrated. Further, "R7", "R8", "R9" and "R10" illustrated in FIGS. 1A, 1B, 1C, and 1D indicate URSs allocated to antenna ports #7 100, #8 105, #9 104, and #10 106, respectively. In addition, FIG. 1A (a), FIG. 1B (a), FIG. 1C (a), and FIG. 1D (a) illustrate examples of mapping between the RB and the URS in a preset particular subframe (e.g., 1, 2, 6, or 7), FIG.

Figure 1B:
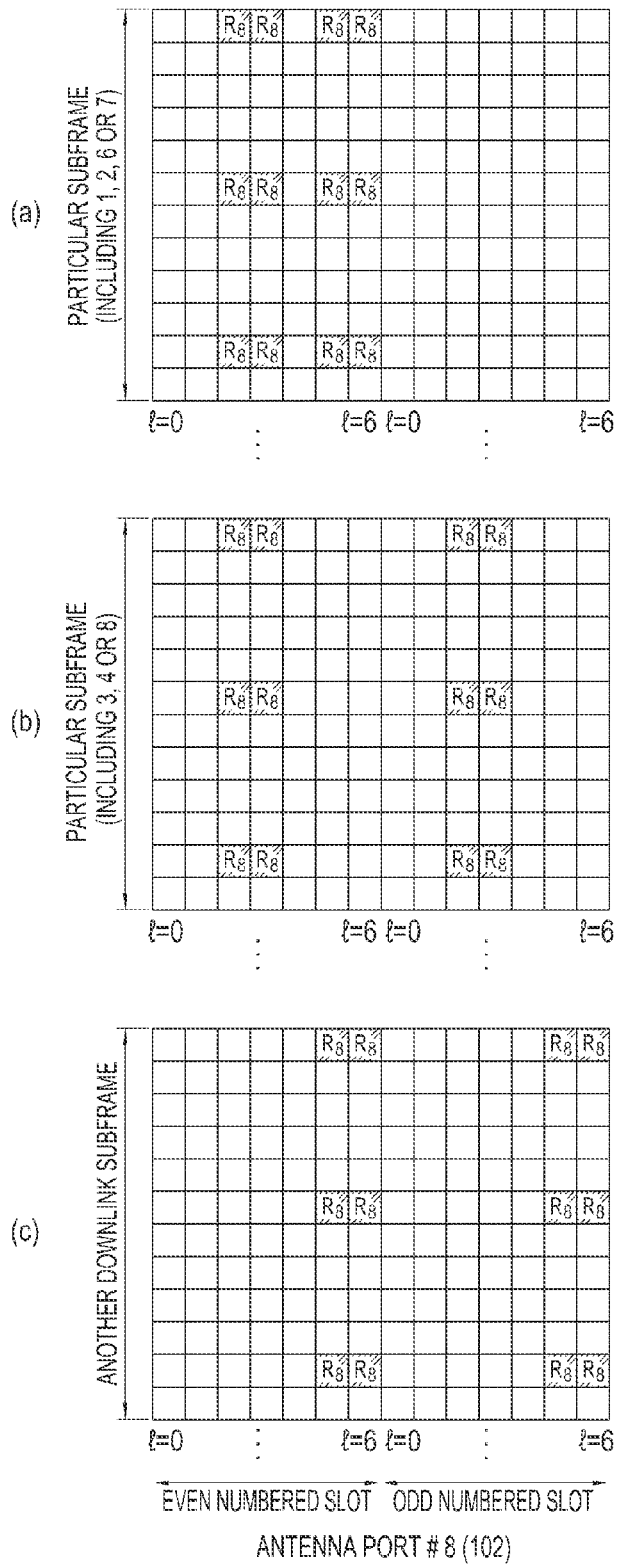
Figure 1C:
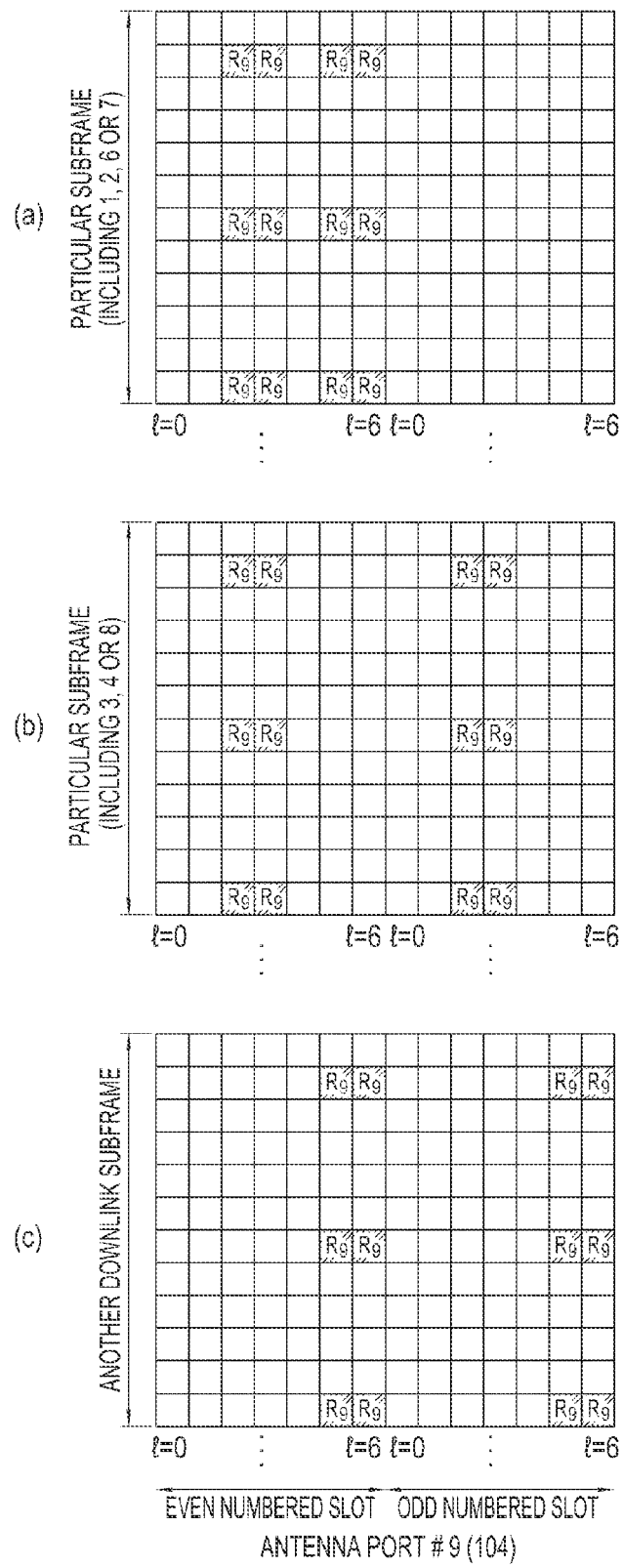
Figure 1D:
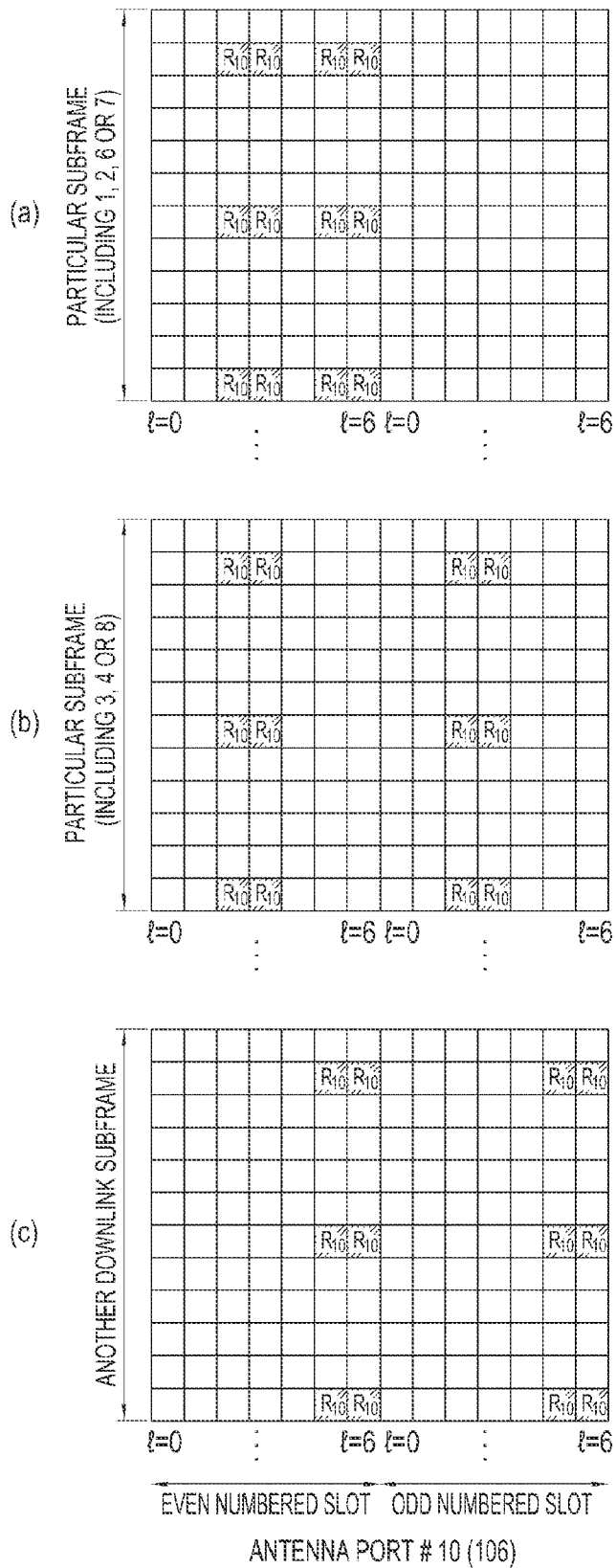

1A (b), FIG. 1B (b), FIG. 1C (b), and FIG. 1D (b) illustrate examples mapping between the RB and the URS in a preset particular subframe (e.g., subframe 3, 4, or 8), and FIG. 1A (c), FIG. 1B (c), FIG. 1C (c), and FIG. 1D (c) illustrate examples of mapping between the RB and the URS in the remaining frames.

As illustrated in FIGS. 1A and 1B, the URSs allocated to antenna ports #7 and #8 100 and 102 indicated by "R7" and "R8" are transmitted in each subframe by using the same resource. Further, as illustrated in FIGS. 1C and 1D, the URSs allocated to antenna ports #9 and #10 104 and 106 indicated by "R9" and "R10" are transmitted in each subframe by using the same resource.

In order to distinguish between URSs transmitted using the same resource for each antenna, orthogonal Walsh sequences may be used. When the Walsh sequence is used, the URSs can be transmitted as mutually orthogonal signals according to Code Division Multiplexing (CDM) and Frequency Division Multiplexing (FDM) and also the number of URSs can be minimized.

The UE is required to estimate a channel value transmitted for each sub-carrier (or each Resource Element (RE)) in order to decode a signal of a serving cell servicing the UE. An apparatus performing such an operation is generally called a channel estimator. The channel estimator estimates a channel value of the RS by using cell IDentifier (ID) information and the RS in order to estimate a channel value of a received signal, and estimates channel values of the remaining sub-carriers based on the estimated channel value of the RS. When the channel value for each sub-carrier is estimated by the channel estimator, an operation of detecting and decoding the received signal based on the estimated channel value is performed. Accordingly, a capability of the channel estimator for the signal of the serving cell most significantly influences a capability of a receiver according to a packet error.

When the serving cell transmits the URS, an adjacent cell may transmit data by using the same resource as the resource (or RE) used when the serving cell transmits the URS. Accordingly, when the URS is transmitted, the problem associated with interference occurs often. As a result, a channel estimation capability deteriorates.

In order to solve the above problem, various embodiments of the present disclosure provide a method in which the adjacent cell does not use the same resource as the resource used when the serving cell transmits the URS when transmitting data. Prior to the description thereof, a wireless communication system according to various embodiments of the present disclosure will be described with reference to FIG. 2.

Figure 2:
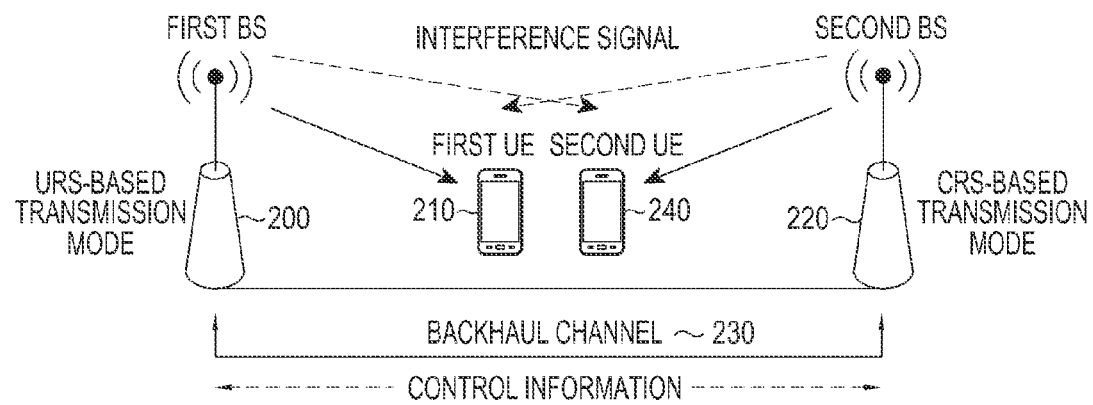
FIG. 2 is a diagram illustrating a wireless communication system according to an embodiment of the present disclosure.

FIG. 2 is a diagram illustrating a wireless communication system according to an embodiment of the present disclosure.

Referring to FIG. 2, the wireless communication system includes a first BS 200, a first UE 210 receiving a signal from the first BS 200, a second BS 220 adjacent to the first BS 200, and a second UE 240 receiving a signal from the second BS 220.

The first BS 200 and the second BS 220 may indicate transmitters used in the wireless communication system. For example, the first BS 200 and the second BS 220 may be eNode Bs (eNBs) when the wireless communication system is an LTE system, and the first BS 200 and the second BS 220 may be Node Bs when the wireless communication system is a UMTS (e.g., WCDMA) system. Further, when signaling to comply with a communication standard is used, the first BS 200 and the second BS 220 may be base stations having a widespread meaning including Evolved Packet Core (EPC), Radio Network Controller (RNC), and the like.

The first BS 200 may use a transmission mode based on the URS, and the second BS 220 may use a transmission mode based on the CRS. As described above, because the first BS 200 and the second BS 220 use different transmission modes, when the first BS 200 transmits the URS, the second BS 220 may transmit data by using the same resource as that used by the first BS 200. Accordingly, the first BS 200 exchanges control information with the second BS 220 through a backhaul channel 230 to improve a channel estimation capability of the first UE 210 when transmitting the URS.

As illustrated in FIG. 2, the backhaul channel 230 simplifies various network configurations which connect BSs in the wireless communication network. According to various embodiments of the present disclosure, the backhaul channel 230 refers to a transmission channel performing signaling and exchanging data between different BSs. The first BS 200 and the second BS 220 exchange control information including signal transmission information within cells thereof and information on transmission modes thereof by using the backhaul channel 230. Although FIG. 2 illustrates that the first BS 200 exchanges the control information with one BS (e.g., the second BS 220), the first BS 200 may exchange the control information with a plurality of adjacent BSs.

According to various embodiments of the present disclosure, each of the first BS 200 and the second BS 220 may transmit a signal with reference to received signal transmission information of the adjacent BS. Particularly, the second BS 220 may improve the channel estimation capability of the first UE 210 by performing a muting operation when using the same resource as that used when the first BS 200 transmits the URS. The muting operation may indicate an operation of disregarding a signal or data to be transmitted in a position (e.g., position on the frequency) of the corresponding resource and thus not transmitting the signal or data, an operation of transmitting a signal (zero power signal) or data of which transmission power is set as "0" in a position of the corresponding position, or an operation of not allocating data to a position of the corresponding resource.

According to various embodiments of the present disclosure, an interference recognition operation described below may be performed. When the aforementioned muting operation is performed, the following interference recognition operation may be omitted or performed as an additional operation.

The first BS 200 makes a request for transmitting information indicating whether the same resource as that used to transmit a current signal is used (or whether there are overlapping resources to acquire a maximum gain by using interference recognition communication) to the second BS 220. Thereafter, the second BS 220 determines whether the same resource is used and then transmits control information including a result thereof to the first BS 200.

The first BS 200 receives the control information and determines whether the second BS 220 is an interference BS using the same resource as the resource used when the first BS 200 transmits the signal to the first UE 210. When the first BS 200 determines the second BS 220 as the interference BS, the first BS 200 generates control information (hereinafter, referred to as "interference control information") on an interference signal to be transmitted to the first UE 210 based on the received control information and transmits the generated interference control information to the first UE 210. Thereafter, the first UE 210 may recognize the interference signal based on the interference control information and perform an interference recognition operation of removing the interference signal from the received signal.

According to various embodiments of the present disclosure, the operation of the first BS 200 may be divided into a passive operation and an active operation. The passive operation includes an operation in which the first BS 200 determines whether there is interference (e.g., generated by using the same resource or partially overlapping resources with the first BS 200) by adjacent cells based on control information received from adjacent BSs, and transmits interference control information according to a result of the determination to the first UE 210. In order to perform the passive operation, respective BSs exchange control information by using respective independent schedulers.

While the passive operation is performed, the first BS 200 transmits the interference control information to the first UE 210 when there is the interference by the adjacent cells, and the first BS 200 may not transmit the interference control information when there is no interference by the adjacent cells.

According to various embodiments of the present disclosure, the active operation includes an operation of scheduling such that, even though no interference is determined to occur as a result of the adjacent cell, if it is expected that there will be a large gain according to interference recognition communication, the first BS 200 may use the same resource as that of the interference BS through a negotiation with the corresponding interference BS when transmitting the URS. In this case, the first BS 200 may determine interference information through which the gain can be acquired and perform a scheduling operation such that a frequency resource is allocated to a maximally similar position to that of the BS transmitting the corresponding interference information. When the active operation is performed, an efficiency of the frequency resource can be increased by allowing the UE which can acquire the gain through the interference recognition communication to maximally share the resource.

When the interference BS does not use the transmission mode which is not based on the URS, the channel estimation capability of the UE may deteriorate due to the data of the interference BS which collides with the URS of the serving BS. In order to solve the above problem, various embodiments of the present disclosure provide a method of muting the data of the interference BS.

Hereinafter, for the convenience of a description, the first BS 200 is referred to as a serving BS, the first UE 210 is referred to as a serving cell UE, the second BS 220 is referred to as an interference BS, and the second UE 240 is referred to as an interference cell UE.

Hereinafter, an operation of the interference BS will be described with reference to FIG. 3.

Figure 3:
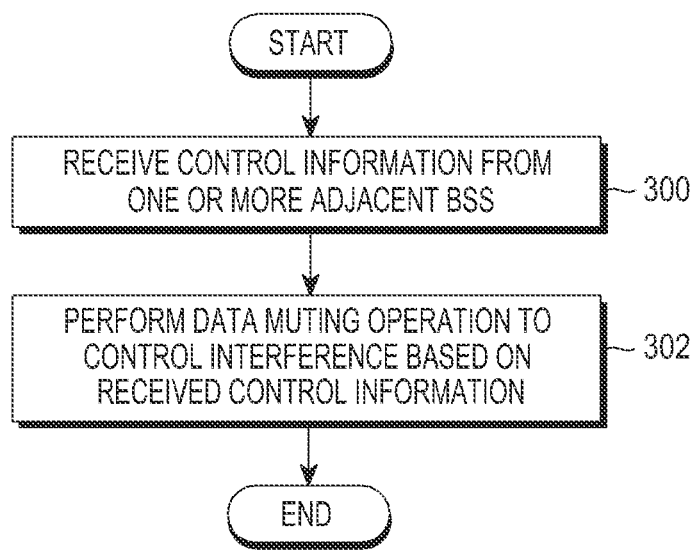
FIG. 3 is a flowchart illustrating a data muting process of an interference Base Station (BS) according to an embodiment of the present disclosure.

FIG. 3 is a flowchart illustrating a data muting process of an interference BS according to an embodiment of the present disclosure.

Referring to FIG. 3, at operation 300, the interference BS receives control information from the serving BS using a transmission mode based on a URS. The control information may include scheduling information such as signal transmission information including URS transmission information of the serving BS and resource allocation information.

Accordingly, the interference BS may identify a resource used to transmit the URS by the serving BS based on the received control information. Further, the interference BS may determine whether the resource used to transmit the URS by the serving BS is the same as that used to transmit data by the interference BS based on the received control information. Alternatively, when the serving BS makes a request for information indicating whether the resources are the same to the interference BS, the information indicating whether the resources are the same may be included in the control information.

Meanwhile, the control information may be received in various ways, such as being received according to a request by the interference BS, received according to a request by the serving BS, or received periodically. Further, the control information may be transmitted to the serving cell UE and the interference cell UE periodically, at a particular time point, or according to a request by the serving cell UE or the interference cell UE in order to be used to control interference of at least one adjacent BS.

When the interference BS performs communication with the serving BS and determines that interference will be provided to the serving cell UE based on the received control information, the interference BS may determine to perform a data muting operation when using the same resource as that used when the serving BS transmits the URS. Accordingly, when it is determined that the interference BS provides the interference when at least one adjacent cell transmits the URS, then at operation 302, the interference BS mutes data to control the interference based on the received control information. For example, the interference BS determines a position (e.g., position on the frequency) of the resource used when the serving BS transmits the URS based on the received control information and performs the data muting operation at the determined position.

According to various embodiments of the present disclosure, when the serving BS uses four antenna ports, the resources used when the serving BS transmits the URS may be limited to minimize a loss generated as the interference BS performs the data muting operation. In this case, the interference BS performs the data muting operation at positions of the limited resources used by the serving BS.

Meanwhile, the serving BS applies a Walsh sequence to the URS for each antenna on the resource (e.g., frequency band) to be used for transmitting the URS. When the serving BS uses four antennas, the Walsh sequence may be as shown in Table 1 below as an example.

TABLE 1

| Antenna port p | $[\bar{w}_p(0)\ \bar{w}_p(1)\ \bar{w}_p(2)\ \bar{w}_p(3)]$ |
|---|---|
| 7 | [+1 +1 −1 −1] |
| 8 | [−1 −1 +1 +1] |
| 9 | [+1 −1 −1 +1] |
| 10 | [−1 +1 +1 −1] |

When the Walsh sequence is applied to the URS, the interference BS performs the muting operation which does not transmit the data using the same resource as that used when the serving BS transmits the URS. Further, the serving BS transmits the URS to which the Walsh sequence is applied to the serving cell UE by using the determined resource.

According to various embodiments of the present disclosure, as the muting operation is performed, the interference BS does not transmit the data while the serving BS transmits the URS, so that the cell of the serving BS does not receive any interference by the data transmission of the interference BS when transmitting the URS.

As described above, according to various embodiments of the present disclosure, the muting operation may be performed to allow the interference BS not to transmit the data while the serving BS transmits the URS or to allow the interference BS to transmit data of which transmission power is set as "0".

Figure 4:
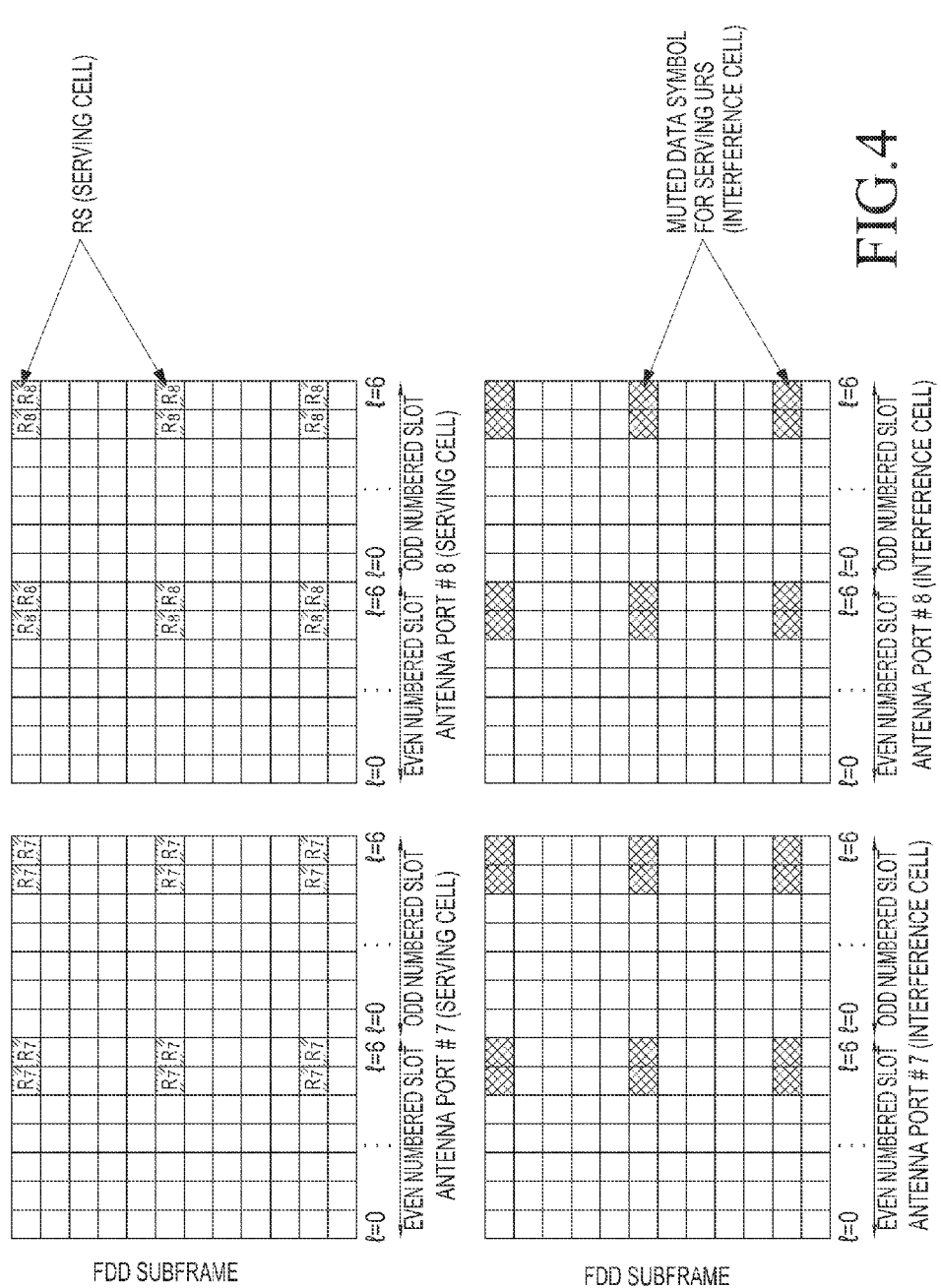
FIG. 4 is a diagram illustrating an example of mapping between an RB and a URS transmitted using two antenna ports and data muting according to an embodiment of the present disclosure.

FIG. 4 is a diagram illustrating an example of mapping between an RB and a URS transmitted using two antenna ports and data muting according to an embodiment of the present disclosure.

Referring to FIG. 4, it may be noted that the data of the interference BS is muted when the serving BS transmits the URS. Specifically, the URSs of the serving BS are mapped into the RBs in antenna port #7 as indicated by "R7", and data of the interference cell is muted at positions corresponding to the URS "R7" on the RBs of the interference cell.

Further, the URSs of the serving BS are mapped into the RBs in antenna port #8 as indicated by "R8", and data of the interference cell is muted at positions corresponding to the URS "R8" on the RBs of the interference cell.

Figure 5:
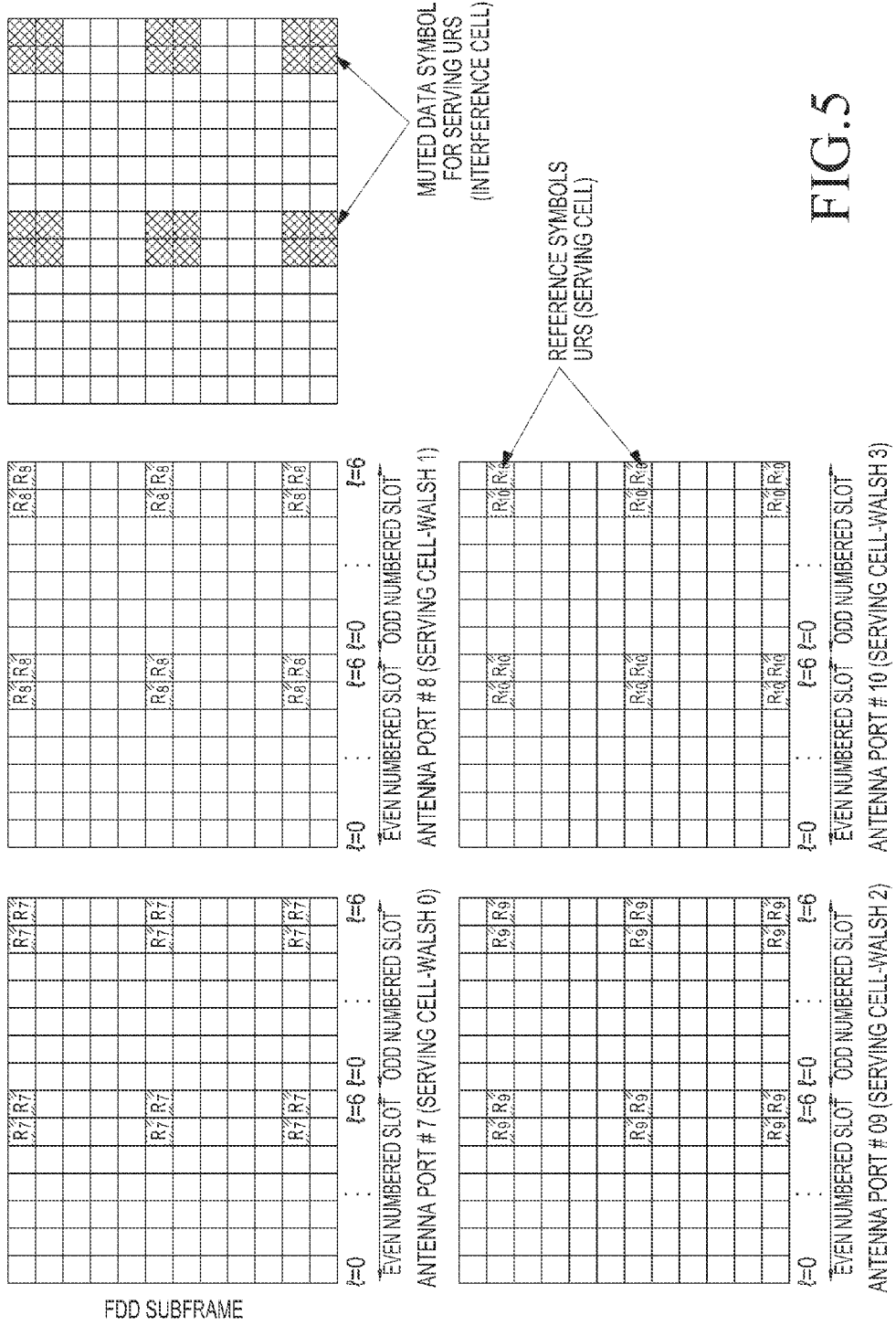
FIG. 5 is a diagram illustrating an example of mapping between an RB and a URS transmitted using four antenna ports and data muting according to an embodiment of the present disclosure.

FIG. 5 is a diagram illustrating an example of mapping between an RB and a URS transmitted using four antenna ports and data muting according to an embodiment of the present disclosure.

Referring to FIG. 5, the URSs of the serving BS are mapped into the RBs in antenna port #7 as indicated by "$R_7$", the URSs of the serving BS are mapped into the RBs in antenna port #8 as indicated by "$R_8$", the URSs of the serving BS are mapped into the RBs in antenna port #9 as indicated by "$R_9$", and the URSs of the serving BS are mapped into the RBs in antenna port #10 as indicated by "$R_{10}$" Further, Walsh sequences orthogonal to each other may be applied the URSs allocated to antenna ports #7, #8, #9, and #10, respectively.

The data of the interference cell is muted to positions corresponding to URS "R7", "R8", "R9", and "R10" on the RBs of the interference cell corresponding to all the antenna ports of the serving cell.

Figure 6:
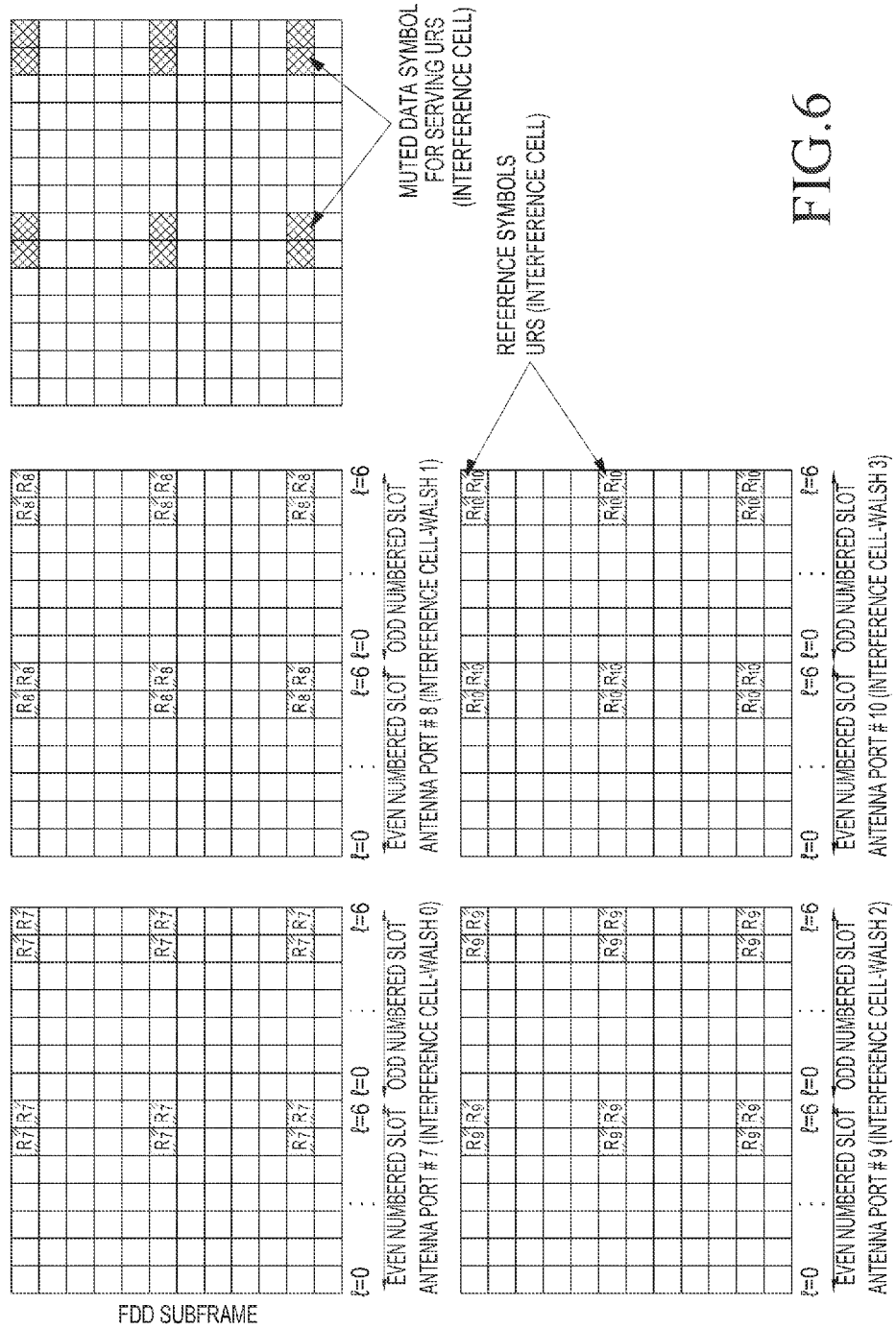
FIG. 6 is a diagram illustrating an example of mapping between an RB and a URS transmitted using four antenna ports and data muting according to an embodiment of the present disclosure.

FIG. 6 is a diagram illustrating an example of mapping between an RB and a URS transmitted using four antenna ports and data muting according to an embodiment of the present disclosure.

Referring to FIG. 6, the URSs are mapped into the RBs of the serving cell in the same way as illustrated in FIG. 4. However, as illustrated in FIG. 6, the data muting operation is performed only for a particular URS in order to minimize a loss generated as the interference BS performs the data muting operation.

When it is determined to perform the data muting operation for antenna ports #7 and #8 of the serving cell, the data of the interference cell is muted at positions corresponding to URS "R7" and "R8" on the RBs of the interference cell corresponding to antenna ports #7 and #8.

Figure 7:
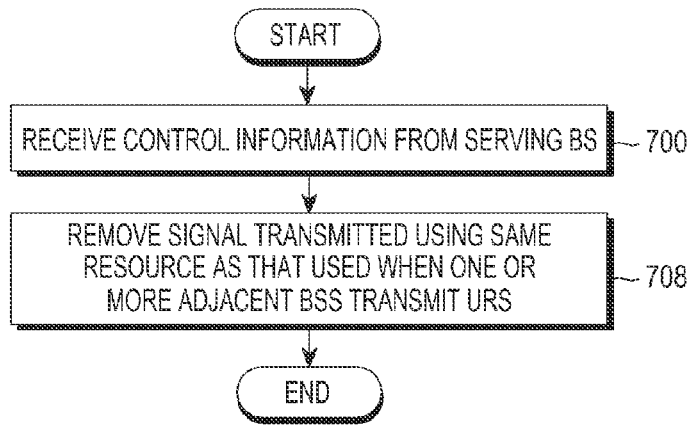
FIG. 7 is a flowchart illustrating a process in which an interference cell User Equipment (UE) receives data according to an embodiment of the present disclosure.

FIG. 7 is a flowchart illustrating a process in which an interference cell UE receives data according to an embodiment of the present disclosure.

Referring to FIG. 7, at operation 700, the interference cell UE receives interference control information from the interference BS. The interference control information may include signal transmission information of each of the interference BS and one or more adjacent BSs adjacent to the interference BS and information related to the data muting of the interference BS. For example, the interference control information may include URS transmission information and resource allocation information of the one or more adjacent BSs.

The interference cell UE determines a URS transmission resource of the one or more adjacent BSs based on the received interference control information. Further, at operation 708, the interference cell UE erases a signal (or data) transmitted using the same resource as a resource (hereinafter, referred to as a "first resource") used for transmitting the URS by the serving BS (e.g., processes a received signal value as "0"). The interference cell UE determines that the data transmission using the first resource is not made by the interference cell. Accordingly, when there is a signal which is transmitted using the first resource, the UE performs the above operation in order to disregard the corresponding signal.

Next, operations of the BS and the UE according to various embodiments of the present disclosure will be described with reference to FIGS. 8 and 9.

Figure 8:
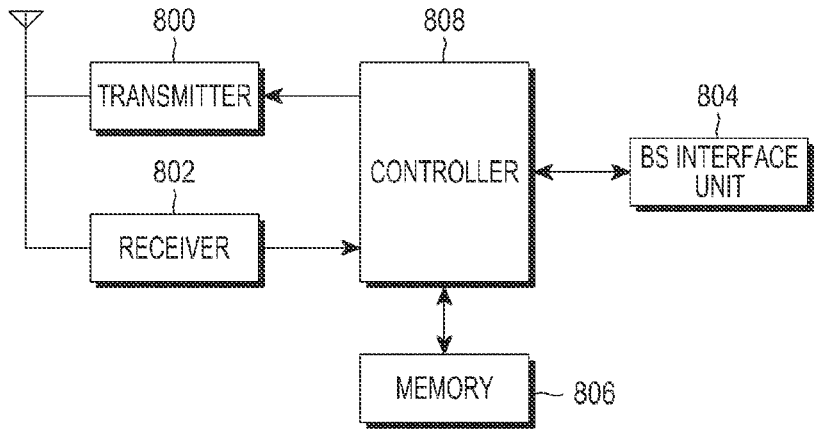
FIG. 8 is a block diagram illustrating a BS according to an embodiment of the present disclosure.

FIG. 8 is a block diagram of the BS according to an embodiment of the present disclosure.

Referring to FIG. 8, the BS includes a transmitter 800, a receiver 802, a BS interface unit 804, a memory 806, and a controller 808.

The transmitter 800 and the receiver 802 are components used for performing communication with the UE. For example, the transmitter 800 transmits a signal such as the URS or the CRS and data to the UE, and the receiver 802 receives a signal and data from the serving cell UE. Although not illustrated in FIG. 8, the transmitter 800 may include an encoder for encoding a transmitted signal and a modulator for modulating the transmitted signal.

The BS interface unit 804 performs communication with one or more adjacent BSs. Specifically, the BS interface unit 804 exchanges control information with the adjacent BSs. The exchanging of the control information may be performed periodically or at a particular time point.

The memory 806 stores all information and data generated during the operation process of the serving BS and the control information received from the one or more adjacent BSs.

The controller 808 determines the operation of the BS by controlling the transmitter 800, the receiver 802, the BS interface unit 804, and the memory 806. Particularly, the controller 808 may control the components such that the URS transmission operation is performed when the BS uses the transmission mode based on the URS and the data muting operation is performed when the BS uses the transmission mode based on the CRS.

Figure 9:
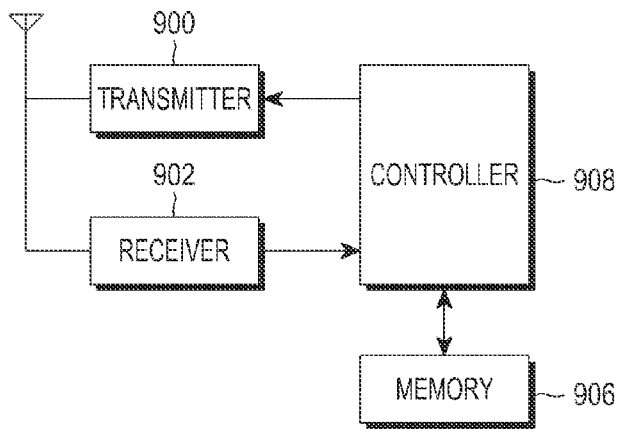
FIG. 9 is a block diagram illustrating a UE according to an embodiment of the present disclosure.

FIG. 9 is a block diagram of the UE according to an embodiment of the present disclosure.

Referring to FIG. 9, the UE includes a transmitter 900, a receiver 902, a memory 906, and a controller 908.

The transmitter 900 and the receiver 902 are components for wireless communication of the UE. The transmitter 900 transmits a signal and data to the BS, and the receiver 902 receives a signal such as the URS or the CRS, and data from the BS and receives a signal of the adjacent BS as an interference signal. Further, although not illustrated in FIG. 9, the receiver 902 may include a demodulator for demodulating a received signal and a decoder for decoding the received signal.

The memory 906 stores all information and data generated during the operation process of the UE.

The controller 908 determines the operation of the UE by controlling the transmitter 900, the receiver 902, and the memory 906. Particularly, the controller 908 controls the components such that the URS transmission method and the data muting operation according to an embodiment of the present disclosure as illustrated in FIG. 7 are performed. Although not illustrated in FIG. 9, the controller 908 may include a channel estimator.

It will be appreciated that various embodiments of the present disclosure according to the claims and description in the specification can be realized in the form of hardware, software or a combination of hardware and software.

Any such software may be stored in a non-transitory computer readable storage medium. The non-transitory computer readable storage medium stores one or more programs (software modules), the one or more programs comprising instructions, which when executed by one or more processors in an electronic device, cause the electronic device to perform a method of the present disclosure.

Any such software may be stored in the form of volatile or non-volatile storage such as, for example, a storage device like a Read Only Memory (ROM), whether erasable or rewritable or not, or in the form of memory such as, for example, Random Access Memory (RAM), memory chips, device or integrated circuits or on an optically or magnetically readable medium such as, for example, a Compact Disk (CD), Digital Versatile Disc (DVD), magnetic disk or magnetic tape or the like. It will be appreciated that the storage devices and storage media are various embodiments of non-transitory machine-readable storage that are suitable for storing a program or programs comprising instructions that, when executed, implement various embodiments of the present disclosure. Accordingly, various embodiments provide a program comprising code for implementing apparatus or a method as claimed in any one of the claims of this specification and a non-transitory machine-readable storage storing such a program.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of transmitting data by a first base station (BS) in a wireless communication, the method comprising:
   receiving control information including information related to transmission of a reference signal (RS) of at least one second BS from the at least one second BS adjacent to the first BS; and
   transmitting data by using a preset method based on the control information when an RS transmission mode of the at least one second BS is different from an RS transmission mode of the first BS,
   wherein the preset method includes a method in which the first BS transmits the data by using a first resource, and the first resource is different from a second resource used when the at least one second BS transmits the RS.

2. The method of claim 1, wherein the transmitting of the data comprises:
   determining a resource used when the at least one second BS transmit the RS based on the control information; and
   performing a muting operation by using the determined resource,
   wherein the muting operation includes one of an operation of transmitting data with transmission power set as "0", an operation of not performing data transmission, and an operation of not allocating data to a corresponding resource.

3. The method of claim 1,
   wherein the RS transmission mode of the first BS includes a transmission mode based on a cell specific reference signal (CRS), and
   wherein the RS transmission mode of the at least one second BS includes a transmission mode based on a user equipment specific reference signal (URS).

4. The method of claim 1, wherein the control information includes at least one of information on a resource used when the at least one second BS transmits the RS, and information indicating whether the resource used when the at least one second BS transmits the RS is equal to a resource used when the first BS transmits the data.

5. A method of receiving data by a user equipment (UE) in a wireless communication system, the method comprising:
   receiving, from a first base station (BS), control information including information related to transmission of a reference signal (RS) of at least one second BS adjacent to the first BS; and
   receiving data from the first BS by using a preset method based on the control information,
   wherein an RS transmission mode of the at least one second BS is different from an RS transmission mode of the first BS, and
   wherein the preset method includes a method in which the first BS transmits the data by using a first resource, and the first resource is different from a second resource used when the at least one second BS transmits the RS.

6. The method of claim 5, wherein the receiving of the data comprises:
   determining a resource used when the at least one second BS transmits the RS based on the control information;
   determining that a muting operation will be performed by using the determined resource; and
   disregarding, when data is received based on the resource used for performing the muting operation, corresponding data,
   wherein the muting operation includes one of an operation in which the first BS transmits data with transmission power set as "0", an operation in which the first BS does not transmit data, and an operation in which the first BS does not allocate data to a corresponding resource.

7. The method of claim 5,
   wherein the RS transmission mode of the first BS includes a transmission mode based on a cell specific reference signal (CRS), and
   wherein the RS transmission mode of the at least one second BS includes a transmission mode based on a user equipment specific reference signal (URS).

8. The method of claim 5, wherein the control information includes information on the resource used when the at least one second BS transmits the RS.

9. A first base station (BS) in a wireless communication system, the first BS comprising:
   a transmitter;
   a receiver configured to receive control information including information related to transmission of a reference signal (RS) of at least one second BS adjacent to the first BS from the at least one BS; and
   a controller configured to control the transmitter to transmit data by using a preset method based on the control information when an RS transmission mode of the at least one second BS is different from an RS transmission mode of the first BS,
   wherein the preset method includes a method in which the first BS transmits the data by using a first resource, and the first resource is different from a second resource used when the at least one second BS transmits the RS.

10. The first BS of claim 9, wherein the controller is further configured to:
    determine a resource used when the at least one second BS transmits the RS based on the control information, and
    perform a muting operation by using the determined resource, and
    wherein the muting operation includes one of an operation of transmitting data with transmission power set as "0", an operation of not performing data transmission, and an operation of not allocating data to a corresponding resource.

11. The first BS of claim 9,
wherein the RS transmission mode of the first BS includes a transmission mode based on a cell specific reference signal (CRS), and
wherein the RS transmission mode of the at least one second BS includes a transmission mode based on a user equipment specific reference signal (URS).

12. The first BS of claim 9, wherein the control information includes at least one of information on a resource used when the at least one second BS transmits the RS, and information indicating whether the resource used when the at least one second BS transmits the RS is equal to a resource used when the first BS transmits the data.

13. A user equipment (UE) in a wireless communication system, the UE comprising:
a receiver configured to receive control information including information related to transmission of a reference signal (RS) of at least one second base station (BS) adjacent to a first BS from the first BS; and
a controller configured to control the receiver to receive data from the first BS by using a preset method based on the control information,
wherein an RS transmission mode of the at least one second BS is different from an RS transmission of the first BS, and
wherein the preset method includes a method in which the first BS receives the data by using a first resource, and the first resource is different from a second resource used when the at least one second BS transmits the RS.

14. The UE of claim 13,
wherein the controller is further configured to:
determine a resource used when the at least one second BS transmits the RS based on the control information,
determine that a muting operation will be performed by using the determined resource, and
disregard, when data is received based on the resource used for performing the muting operation, corresponding data, and
wherein the muting operation includes one of an operation in which the first BS transmits data with transmission power set as "0", an operation in which the first BS does not transmit data, and an operation in which the first BS does not allocate data to a corresponding resource.

15. The UE of claim 13,
wherein the RS transmission mode of the first BS includes a transmission mode based on a cell specific reference signal (CRS), and
wherein the RS transmission mode of the at least one second BS includes a transmission mode based on a user equipment specific reference signal (URS).

16. The UE of claim 13, wherein the control information includes information on the resource used when the at least one second BS transmits the RS.

17. A non-transitory computer-readable storage medium storing instructions that, when executed, cause at least one processor to perform the method described in claim 1.

18. A non-transitory computer-readable storage medium storing instructions that, when executed, cause at least one processor to perform the method described in claim 5.

* * * * *